United States Patent [19]

Duling, III et al.

[11] Patent Number: 5,303,314

[45] Date of Patent: Apr. 12, 1994

[54] METHOD AND APPARATUS FOR POLARIZATION-MAINTAINING FIBER OPTICAL AMPLIFICATION WITH ORTHOGONAL POLARIZATION OUTPUT

[75] Inventors: Irl N. Duling, III, Round Hill; Ronald D. Esman, Burke, both of Va.

[73] Assignee: The United States of America as represented by the Secretary of the Navy, Washington, D.C.

[21] Appl. No.: 31,251

[22] Filed: Mar. 15, 1993

[51] Int. Cl.$^5$ ............................................. G02B 5/30
[52] U.S. Cl. ............................... 385/11; 385/27; 372/6; 359/341
[58] Field of Search ............... 385/27, 30, 39, 11, 385/1; 359/333, 341, 349; 372/6, 20, 102

[56] References Cited

U.S. PATENT DOCUMENTS

| | | | |
|---|---|---|---|
| 4,941,738 | 7/1990 | Olsson | 350/377 |
| 5,042,039 | 8/1991 | Edagawa et al. | 385/141 |
| 5,050,183 | 9/1991 | Duling, III | 372/94 |
| 5,089,786 | 2/1992 | Tamura | 359/333 |
| 5,134,620 | 7/1992 | Huber | 372/6 |
| 5,138,621 | 8/1992 | Goto et al. | 372/38 |
| 5,164,954 | 11/1992 | Su | 372/20 |
| 5,198,921 | 3/1993 | Aoshima et al. | 385/11 |

FOREIGN PATENT DOCUMENTS

| | | | |
|---|---|---|---|
| 0046432 | 2/1990 | Japan | 359/349 |
| 4-238328 | 8/1992 | Japan | 359/341 |

OTHER PUBLICATIONS

Krasinski et al. "Multipass Amplifiers Using Optical Circulators", IEEE Journal of Quantum Electronics, vol. 26, No. 5, May 1990, pp. 950–958.

Nishi et al., "High Efficient Configuration of Erbium-doped Fiber Amplifier", 16th European Conf. on Optical Communication, Sep. 16–20, 1990, Amsterdam, vol. 1, pp. 99–102.

Pistoni et al., "Polarization Noise Suppression in Retracting Optical Fiber Circuits", Optics Letters, vol. 16, No. 10, May 15, 1991, pp. 711–713.

Morioka et al., "Ultrafast Reflective Optical Kerr Demultiplexer Using Polarisation Rotation Mirror", Electronics Letters, vol. 28, No. 6, Mar. 12, 1992, pp. 521–522.

Primary Examiner—John D. Lee
Assistant Examiner—Hemang Sanghavi
Attorney, Agent, or Firm—Thomas E. McDonnell; George Jameson

[57] ABSTRACT

A single-polarization fiber optical amplifier and corresponding method is provided capable of amplifying an optical input signal by a fiber optic amplifier constructed of fiber which may be non-polarization-maintaining. The single-polarization fiber optical amplifier provides a direction-selective coupler which receives an optical input at a first port and outputs an optical output at a second port. A fiber optic amplifier is operatively connected to the direction-selective coupler at a bidirectional port for amplifying the optical input. A retro-reflecting orthogonal polarization converter is operatively connected to the fiber optic amplifier, reflecting the amplified optical input from the fiber optic amplifier in a return direction through the fiber optic amplifier and in an orthogonal polarization to the amplified optical input. The direction-selective coupler outputs the reflected amplified orthogonal optical input at the second port as the optical output of the direction-selective coupler. Further configurations adapting the input and output ports to transmit the optical signal through cavity or other structures may be provided to produce, for example, an ultrashort pulse optical source; a single-wavelength, single-polarization, widely-tunable laser source; or an amplified spontaneous emission source.

27 Claims, 8 Drawing Sheets

METHOD AND APPARATUS FOR POLARIZATION-MAINTAINING FIBER OPTICAL AMPLIFICATION WITH ORTHOGONAL POLARIZATION OUTPUT

FIELD OF THE INVENTION

The present invention relates to a single-polarization fiber optical amplifier and, more particularly, to a single-polarization fiber optical amplifier capable of receiving an optical input of a given polarization, amplifying that input, and providing an amplified optical output with orthogonal polarization.

DESCRIPTION OF THE RELATED ART

Fiber optical applications of various kinds today require transmission of an optical signal whose polarization is well maintained throughout a transmission link. In a typical communications application, for example, an optical information signal (e.g., voice data) may be transmitted over a length of optical fiber. Due to transmission losses in even high-quality fiber, however, after a certain transmission distance it is necessary to intercept the transmitted signal, amplify or otherwise treat the signal to return it to clean form, and then retransmit the signal through the next fiber length.

Figure 1:
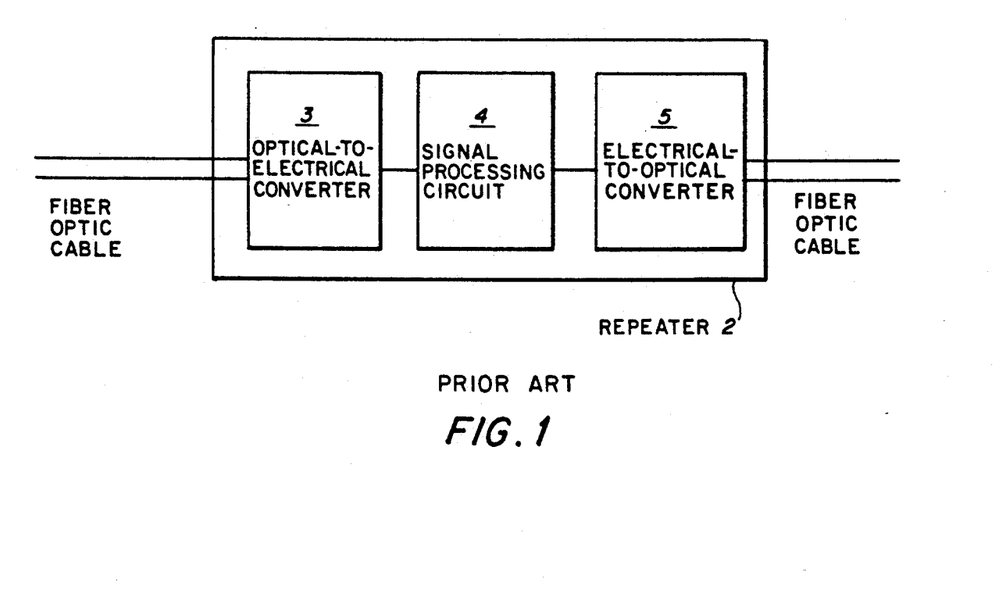
FIG. 1 illustrates a schematic diagram of a conventional electrical/optical repeater.

FIG. 1 schematically illustrates an older-style optical communication repeater 2. An optical-to-electrical converter 3 converts the transmitted signal from the optical domain into electrical signals, a signal processing circuit 4 processes the electrical signals, and an electrical-to-optical converter 5 converts the electrical signals back into an optical signal for retransmission. All of these conversions may cause signal degradation. However, with the advent of improved optical fibers whose properties allow them to function as amplifiers purely in the optical domain, erbium-doped fiber and other strictly fiber implementations have been attempted to eliminate the need for optical/electrical repeaters. Such amplifiers which amplify in the optical domain using a length of fiber are called fiber optic amplifiers.

However, the choice of purely optical amplifiers in communications or other applications involves other disadvantages. Optical fiber has a tendency to exhibit a varying anisotropic refractive index, that is, distort the polarization, phase or other characteristics of a transmitted optical signal when the optical fiber material is influenced by changes in temperature or is physically disturbed. It has therefore become necessary to use specially-treated optical fiber capable of maintaining a polarization of a transmitted optical signal, or polarization-maintaining fiber, including erbium or other rare-earth-doped fiber. However, erbium-doped or other polarization-maintaining amplifying fiber is at present very difficult to obtain, and markedly expensive relative to other (non-polarization-maintaining) types of optical fiber.

Some implementations have attempted to create optical amplifiers capable of amplifying an optical input signal while maintaining accurate polarization. See e.g. Tamura et al., U.S. Pat. No. 5,089,786; "Multipass Amplifiers Using Optical Circulators", J. Krasinski et al., IEEE Journal of Quantum Electronics, Vol. 26, No. 5, May 1990; and Olsson, U.S. Pat. No. 4,941,738. Such devices have included in part a Faraday mirror or rotator for reflecting optical signals with polarization coherence through some type of amplifier, such as a semiconductor. However, such devices still generally require the routing of the optical signal through some type of amplifying medium (semiconductor or otherwise) different from the optical fiber through which the optical signal is input, and have generally been somewhat complicated in design or necessitated a strictly bulk-component approach to implementation.

SUMMARY OF THE INVENTION

It is accordingly an object of the present invention to overcome these and other difficulties by providing a single-polarization fiber optical amplifier capable of faithfully reproducing a polarized input signal without the need for use of expensive and difficult-to-obtain polarization-maintaining fiber optical amplifiers.

Another object of the present invention is to provide a single-polarization fiber optical amplifier capable of using a relatively common, non-polarization-maintaining fiber in a straightforward, compact and economical fiber optical amplifier implementation.

Another object of the present invention is to provide an orthogonal output state of polarization, which implies maintaining and switching the input state of polarization. While polarization-maintaining fiber amplifiers require input on a principal axis of the fiber, this invention provides the orthogonal state of polarization completely independent of input state.

Another object of the present invention is to provide an output polarization state independent of environmental perturbations to the fiber optical amplifier, yet requiring no active control of polarization.

A further object of the present invention is to provide a single-polarization fiber optical amplifier which can be built to satisfy different applications quite flexibly. Such applications include providing substantially single-wavelength laser output, or functioning as an amplified spontaneous emission source.

The present invention, accomplishing these and other objects, may in one embodiment have a single-polarization fiber optical amplifier comprising a direction-selective coupler receiving an optical input at a first port and outputting an optical output at a second port, and a fiber optic amplifier operatively connected to the direction-selective coupler for optically amplifying the optical input. A retro-reflecting orthogonal polarization converter is operatively connected to the fiber optic amplifier, and reflects the amplified optical input from the fiber optic amplifier in a return direction through the fiber optic amplifier and in an orthogonal polarization to the amplified optical input. The direction-selective coupler outputs the reflected amplified orthogonal optical input at the second port as the optical output.

The operation and embodiments of the present invention will be described with reference to the accompanying drawings.

DETAILED DESCRIPTION OF THE PREFERRED EMBODIMENTS

Figure 2:
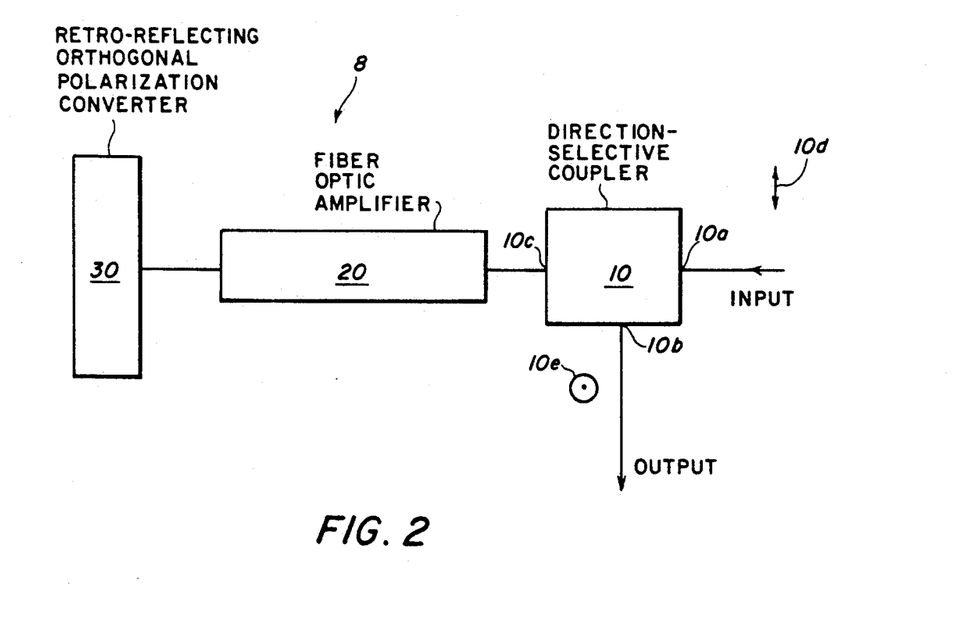
FIG. 2 illustrates a schematic diagram of a first embodiment of the single-polarization fiber optical amplifier of the present invention.

FIG. 2 illustrates a schematic diagram of a first embodiment of the single-polarization fiber optical amplifier 8 of the present invention. A direction-selective coupler 10 is connected to a fiber optic amplifier 20 through a bidirectional port 10c, as illustrated in FIG. 2. The fiber optic amplifier 20, which amplifies an optical input in the optical domain, may be constructed in a number of ways, as discussed below. The fiber optic amplifier 20 is in turn connected to a retro-reflecting orthogonal polarization converter 30, serving as a terminal element to reflect the amplified optical input back through the fiber optic amplifier 20.

More particularly, the direction-selective coupler 10 receives an optical input at a first port 10a and outputs an optical output at a second port 10b. That is, the present invention receives an optical input 10d with a certain polarization (illustrated as parallel to the plane in FIG. 2) through the direction-selective coupler 10. The direction-selective coupler 10 passes light in one direction at a first port 10a. On receiving light back at port 10c from the opposite direction, the direction-selective coupler 10 will divert that returned light for output from port 10b as optical output 10e with a polarization (illustrated as perpendicular to the plane in FIG. 2) orthogonal to the optical input 10d in another direction at a second port 10b. The direction-selective coupler 10 may for instance be practically implemented as a polarization-insensitive optical circulator, or as a polarization beam splitter such as that offered by OZ Optics of Ontario, Canada, part no. FOBS-12P-111-9/125-PPS-1550-PBS-45, or others. The initial pass of the optical input after arriving into the direction selective coupler 10 and passing through bidirectional port 10c is input into fiber optic amplifier 20, to strengthen the optical input signal.

After amplification by fiber optic amplifier 20, the amplified version of the optical input is passed to retro-reflecting orthogonal polarization converter 30. The retro-reflecting orthogonal polarization converter 30 returns the amplified optical input through the fiber optic amplifier 20, while maintaining polarization coherency.

Figure 3A:
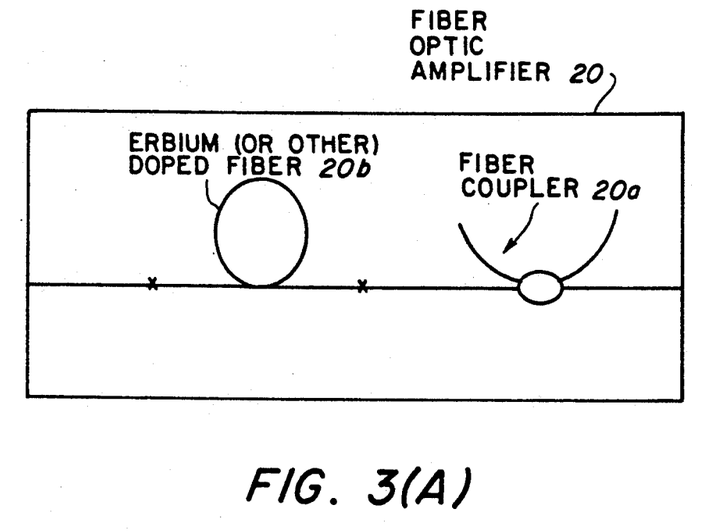
FIGS. 3(A) and 3(B) illustrate schematic diagrams of a fiber optic amplifier.

As illustrated in FIG. 3(A), the fiber optic amplifier 20 may be implemented as a fiber coupler 20a receiving pumping energy (such as a laser) and connected to a length of erbium-doped optical fiber 20b through the coupler 20a, to produce natural optical amplification. While erbium-doped optical fiber 20b is illustrated, it should be understood that other optically amplifying optical fiber may instead be used. The degree of amplification may be increased by a longer length of doped optical fiber, although no particular overall length is required. An example of a commercial erbium-doped fiber optic amplifier, which is suitable for use as the optic amplifier 20, is offered by BT&D Technologies of Wilmington, Del., part no. EFA-1400-1550.

Figure 3B:
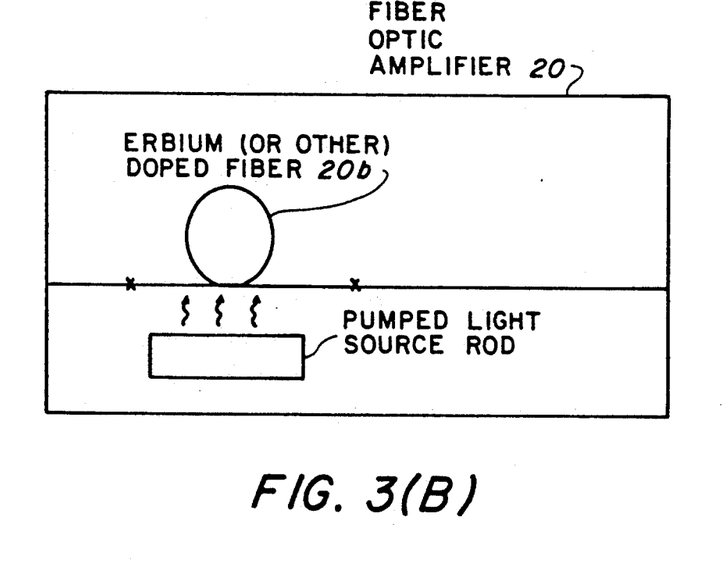

As illustrated in FIG. 3(B), instead of utilizing such a fiber coupler 20a, an alternative amplification may be provided by directly irradiating a length of fiber 20b by a pumped light source 20d. Moreover, other variations are possible for a fiber optic-based amplifier. However, none according to the present invention require a polarization-maintaining fiber.

Figure 4A:
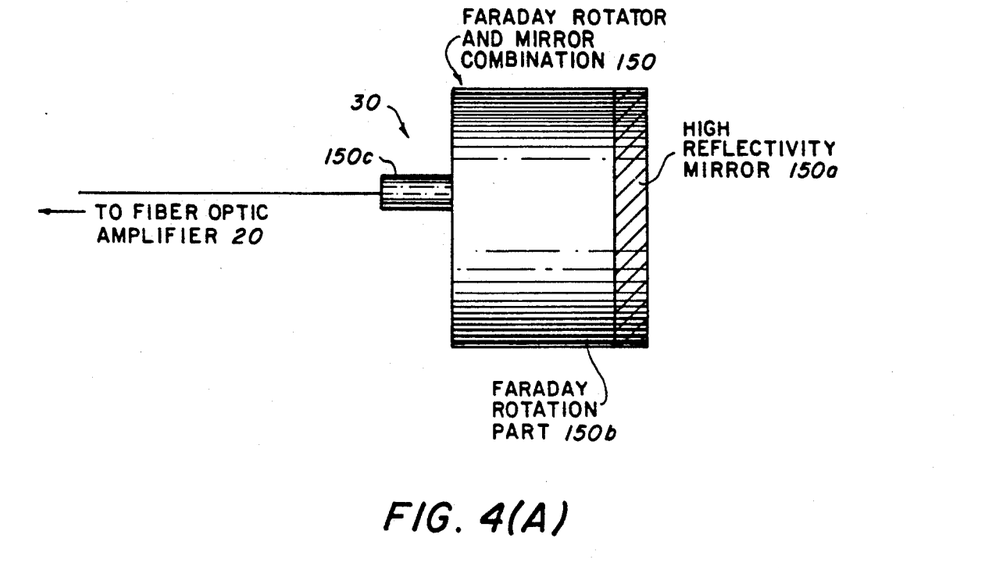
FIGS. 4(A) and 4(B) illustrate schematic diagrams of a Faraday rotator and mirror combination.

As illustrated in FIG. 4(A), the retro-reflecting orthogonal polarization converter 30 may be implemented as a conventional Faraday rotator and mirror combination 150. The Faraday rotator and mirror combination 150 may consist of a lens 150c coupled to a Faraday rotation part 150b coupled to a high reflectivity end mirror 150a. That is, light enters the lens 150c and passes through the Faraday rotation part 150b and is rotated by a certain amount (preferably 45 degrees), after which the light strikes the end mirror 150a and returns through the Faraday rotation port 150b and lens 150c. However, the optical rotation in the Faraday rotation part 150b on the return trip adds, rather than subtracts, after reflection by the end mirror. Such rotation results in an orthogonal output. The net effect is that the optical input passes through the direction-selective coupler 10 and then through the fiber optic amplifier 20 and strikes the retro-reflecting orthogonal polarization converter 30 (Faraday rotator and mirror combination or other form), distortions in the polarization of the optical signal caused by fiber birefringence are orthogonally "unwound"0 on the return trip through the optical fiber.

Figure 4B:
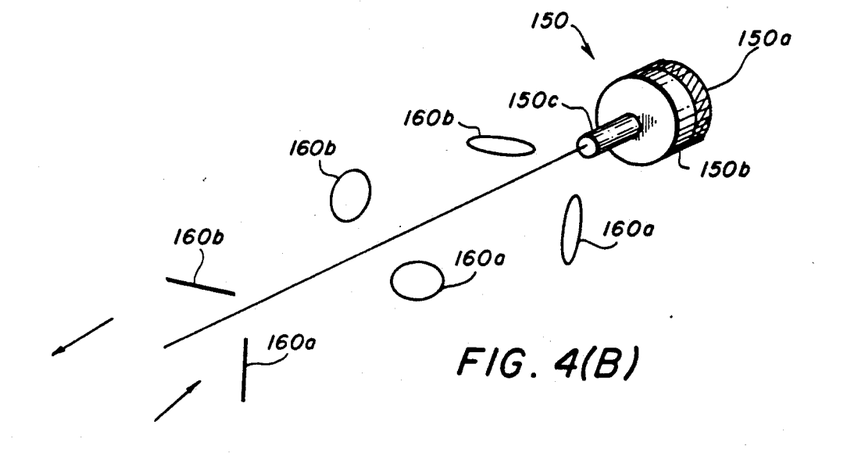

FIG. 4(B) illustrates a further schematic diagram of the Faraday rotator and mirror combination 150, emphasizing the phase change produced by the mirrors contained therein. As illustrated in FIG. 4(B), polarization or phase changes in an optical signal 160a after such travel and reflection accumulate, so that optical signal 160a emerges after reflection in an orthogonal state 160b, regardless of the type of polarization of the optical input state, which may for instance be linear or elliptical-polarized. An example of a commercial Faraday rotator and mirror combination 150 suitable for use in the present invention is that offered by Optics for Research of Caldwell, N.J., part no. MFI-IR2.

In the present invention orthogonal polarization is maintained whether the fiber used in fiber optic amplifier 20 is polarization-maintaining fiber or not. That is, regardless of the perturbations to the polarization of the internal signal as it travels to the retro-reflecting orthogonal polarization converter 30 and back, those distortions are compensated on return through the fiber making up the fiber optic amplifier 20 as the optical signal is transformed into an orthogonal state. The amplified optical input, as it returns to the direction-selective coupler 10 and is ultimately output as optical output 10e from the second port of that coupler, is therefore orthogonal to the first received optical input 10d, as indicated in FIG. 2.

Therefore, transmission difficulties such as interfering modes and other distortions resulting from birefringence are substantially reduced or eliminated. Moreover, the need for other conventional polarization treatment devices in the optical signal path (such as polarization controllers) are eliminated. The fiber optic amplifier 20 may be straightforwardly constructed of common non-polarization-maintaining fiber, reducing cost and complexity.

Figure 5:
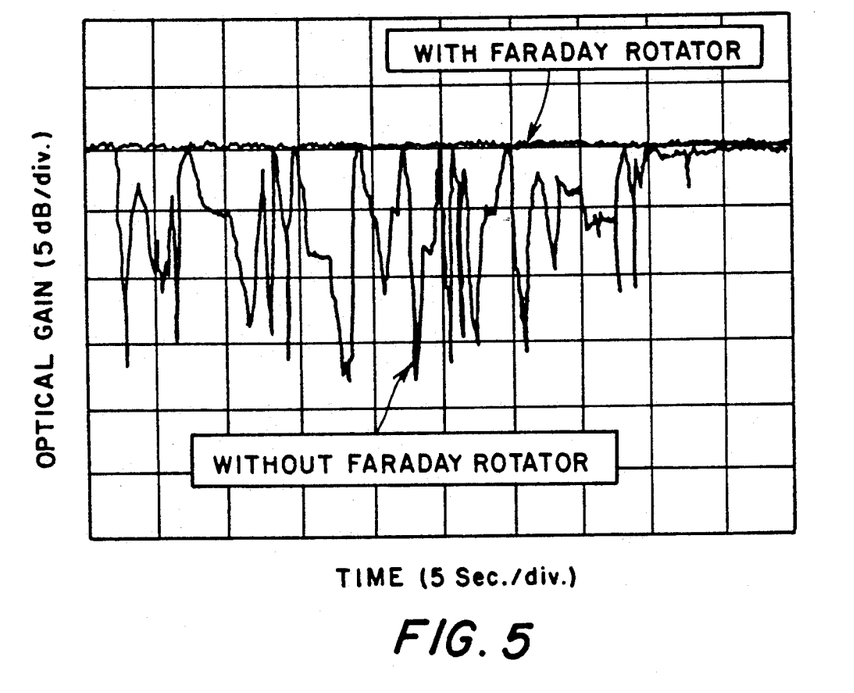
FIG. 5 is a graph of experimental results demonstrating the degree of consistency of amplification gain by the single-polarization fiber optical amplifier of the present invention.

FIG. 5 is a graph of experimental results demonstrating the degree of consistency of amplification gain by the single-polarization fiber optical amplifier 8 (FIG. 2) of the present invention. Amplification gain is compared to an amplifier configuration employing a conventional mirror rather than a retro-reflecting orthogonal polarization converter 30 (FIG. 2) as a terminal element. As can be seen in FIG. 5, the optical gain of the amplifier lacking a retro-reflecting orthogonal polarization converter (or Faraday rotator and mirror combination) suffers a variance of several dB over time in a fluctuating manner, due to birefringence effects. The single-polarization fiber optical amplifier 8 of the present invention with the Faraday rotator and mirror combination, in contrast, achieves an optical gain consistent within approximately 1 dB or less, as illustrated in FIG. 5.

Figure 6:
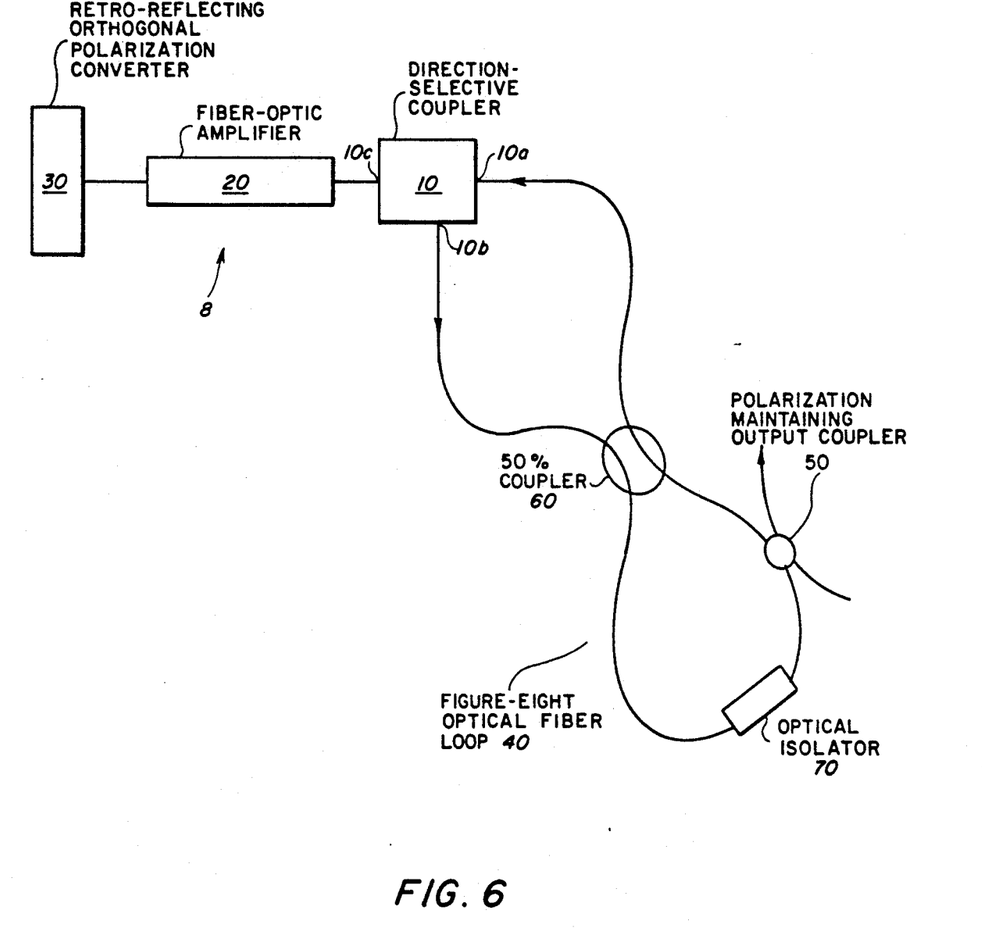
FIG. 6 illustrates a schematic diagram of a second embodiment of the single-polarization fiber optical amplifier of the present invention.

FIG. 6 illustrates a schematic diagram of a second embodiment of the present invention, similar to the first embodiment in basic form, but with additional optical signal treating structure attached to the direction-selective coupler 10 to achieve lasing effects. In the second embodiment, the input port 10a and the output port 10b of the direction-selective coupler 10 are connected to an optical fiber of a figure-eight optical fiber loop 40, forming a lasing cavity to create laser action light amplification by the single-polarization fiber optical amplifier 8. In this embodiment of the present invention, a laser output is provided through a polarization-maintaining output coupler 50. A conventional polarization-maintaining optical isolator 70 is preferably inserted in a portion of the figure-eight optical fiber loop 40, and a conventional polarization-maintaining 50% coupler 60 is preferably provided at a narrow waist portion of the figure-eight optical fiber loop 40 to create feedback in the loop, the overall configuration resulting in a laser system having good stability, little output inconsistency and eliminating the need for polarization controllers, and also producing a relatively short output pulse width. For a more detailed explanation of the operation of a figure-eight shaped optical source, see U.S. Pat. No. 5,050,183 which patent is herein incorporated by reference.

Figure 7:
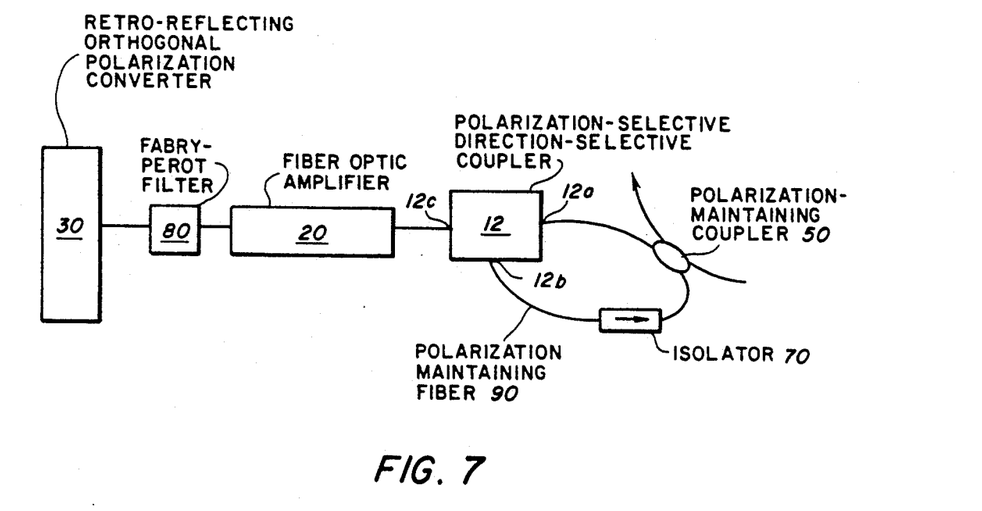
FIG. 7 illustrates a schematic diagram of a third embodiment of the present invention.

FIG. 7 illustrates a schematic diagram of a third embodiment of the present invention, also sharing the fiber optic amplifier 20 and retro-reflecting orthogonal polarization converter 30 of the first embodiment. In the third embodiment, direction-selective coupler 10 (FIG. 2) is chosen to be a polarization-selective coupler, that is, either 1) a polarization-selective direction-selective coupler 12 or 2) a polarization-insensitive direction-selective coupler 10 (FIG. 2) with a polarizing element (not shown) incorporated in fiber loop 90. A polarization-selective direction-selective coupler 12 is assumed in the following. The description for the case of a (polarization-insensitive) direction-selective coupler and a polarizer will become obvious to those skilled in the art. Also in this third embodiment, A) a conventional tunable Fabry-Perot filter 80 with low back reflection (or equivalent optical filter, for example a tunable wavelength selective mirror used as part of the Faraday rotator and mirror combination) is inserted between the retro-reflecting polarization converter 30 and the fiber optic amplifier 20 and B) input port 12a and output port 12b of the polarization-selective direction-selective coupler 12 are connected to a polarization-maintaining optical fiber loop 90 preferably having an optical isolator 70 and a polarization-maintaining output coupler 50. The operation of this embodiment is as follows. Weak spontaneous emission (light) is emitted from fiber optic amplifier 20 in both directions of the fiber and is unpolarized. Tracing the light heading to the left of FIG. 7, first the light is filtered by Fabry-Perot filter 80 and then is retro-reflected to the orthogonal state of polarization by retro-reflecting orthogonal polarization converter 30. The light is then filtered a second time by filter 80 and amplified by fiber optic amplifier 20 as it travels to the right in FIG. 7. Continuing to trace the light to the right, the light enters polarization-selective direction-selective coupler 12 at port 12c; a component of the light in one linearly polarized state exits at port 12a and the component in the other linear polarization state is directed (down the figure) out port 12b. Since the light exiting at port 12a is traveling opposite to the preferred direction of optical isolator 70, it is absorbed by optical isolator 70 and can be disregarded. The light exiting port 12b, however, travels on to optical isolator 70 and passes through to output coupler 50. At the output coupler 50, part of the light is extracted for usable laser output power and part of the light continues in the fiber optic system of FIG. 7. After the output coupler 50, the light is returned to polarization-selective direction-selective coupler 12 at port 12a. The polarization-maintaining fiber loop 90 contains a 90° twist in orientation of the principal axis so that, upon return to polarization-selective direction-selective coupler 12 (port 12a), the light is in the appropriate polarization state so that it exits at port 12c. The light then completes a round trip through the system when it passes through fiber optic amplifier 20 a second time. Additional round trips cause the fiber system of FIG. 7 to oscillate at optical wavelengths that experience the least round-trip optical loss and is determined by the Fabry-Perot filter 80. Because the counterpropagating optical waves are in orthogonal polarization states, there is no mutual interference of the optical waves and therefore the consequence of spatial hole burning and its associated problems (e.g., mode-hopping) are avoided. In one round trip the light passes through the amplifier 20 twice, thus providing improved extraction of amplifier energy over single-pass designs. In this embodiment of the present invention, a linear polarized laser output is provided through a polarization maintaining output coupler 50. The overall configuration results in a laser system having 1) substantially single output wavelength, 2) widely tunable output wavelength 3) stable output polarization, 4) improved extraction of fiber optic amplifier energy, 5) no polarization mode competition, 6) no spatial hole burning, and 7) no need for conventional polarization controllers.

Figure 8:
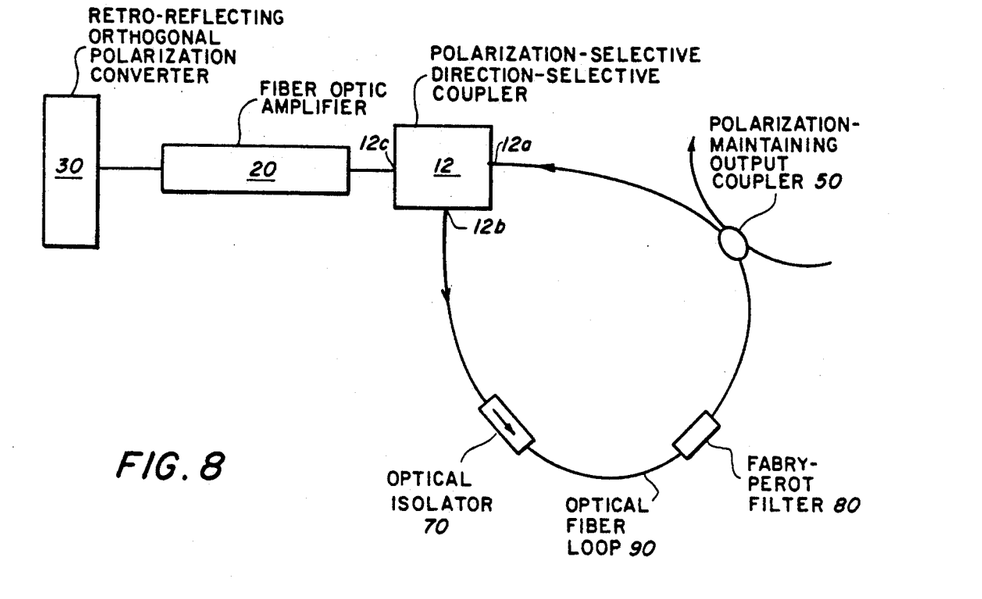
FIG. 8 illustrates a schematic diagram of a fourth embodiment of the single-polarization fiber optical amplifier of the present invention.

FIG. 8 illustrates a schematic diagram of a fourth embodiment of the present invention, also sharing the fiber optic amplifier 20 and retro-reflecting orthogonal polarization converter 30 of the first embodiment as well as the choices for direction-selective coupler 10 (FIG. 2) of the third embodiment. In this fourth embodiment, a conventional tunable Fabry-Perot filter (or equivalent) 80 is inserted in the polarization-maintaining fiber optic loop 90. Also in this embodiment of the present invention, input port 12a and the output port 12b of the polarization-selective direction-selective coupler 12 are connected to a polarization-maintaining fiber loop 90 preferably having an isolator 70. A laser output is provided through a polarization-maintaining output coupler 50. The operation of this embodiment is similar to that of the third embodiment. The difference is that with this fourth embodiment the optical filtering is accomplished in a single pass through the Fabry-Perot filter 80 in the fiber loop instead of a double-pass filtering as described in the third embodiment. The overall configuration results in a laser system exhibiting all of the advantages of the third embodiment. The added advantage of this fourth embodiment is that, since a second optical isolator (not shown) may be placed after the filter in fiber loop 90, filter 80 may have reflections without deleterious effects on the laser operation. However, being in the fiber loop 90, the filter must be connected with polarization-maintaining fiber. Placement of optical isolators within polarization-maintaining fiber loop 90 of the third and fourth embodiments for optimal performance may be dictated by the specific application and will be apparent to those skilled in the art.

Figure 9:
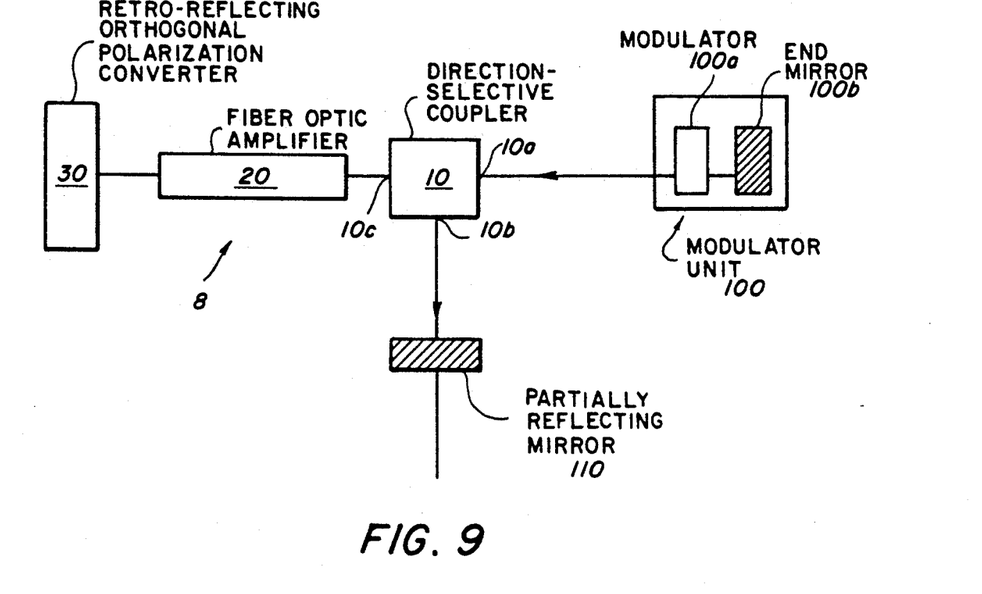
FIG. 9 illustrates a schematic diagram of a fifth embodiment of the single-polarization fiber optical amplifier of the present invention.

FIG. 9 illustrates a schematic diagram of a fifth embodiment of the present invention, wherein the input port 10a is connected to a modulator unit 100 including a conventional modulator 100a and a conventional end mirror 100b, and the output port 10b of the direction-selective coupler is connected to a conventional partially-reflecting output mirror 110. In this embodiment of the present invention, a laser output is provided through the partially-reflecting output mirror 110, the overall configuration resulting in a laser system having an ultra-short pulse width. In this embodiment, the direction-selective coupler 10 (FIG. 2) is chosen to be polarization selective so that the single-polarization fiber optical amplifier 8 (FIG. 2) coupled to the modulator unit 100 serves in effect as a nonlinear mirror. In the linear operation of the single-polarization fiber optical amplifier 8 (FIG. 2), light entering the input port 10a will all exit the amplifier through the output port 10b. If the intensity is high enough at the input 10a that the nonlinear Kerr effect alters the polarization state returning to the polarization-selective direction-selective coupler 10 from that in the linear case, a small amount of light corresponding to the highest intensities will exit the single polarization amplifier to be reflected by end mirror 100b back into the single polarization amplifier. In this way only the highest intensities will see the feedback necessary for laser operation and the laser output will be a series of ultrashort pulses. To initiate this nonlinear process it may be necessary to use low level lasing between partially reflecting mirror 110 and end mirror 100b modelocked in a conventional manner by modulator 100a to form an initial pulse in the cavity. The strength of the non-linear effect can be adjusted by inserting a polarization controller (not shown) in the single polarization amplifier and adjusting the equivalent birefringent axes of the fiber to place more or less of the light on that axis appropriate to maximize the non-linear effect.

Figure 10:
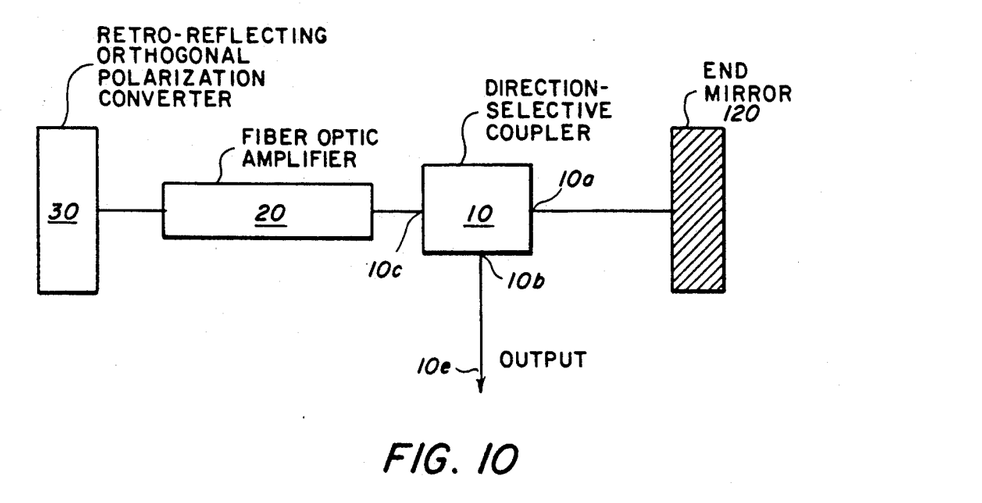
FIG. 10 illustrates a schematic diagram of a sixth embodiment of the single-polarization fiber optical amplifier of the present invention.

FIG. 10 illustrates a schematic diagram of a sixth embodiment of the present invention, wherein the input port 10a is connected to an end mirror 120. Because the end mirror returns the optical signal produced by the pumping action of fiber optic amplifier 20 along the mirror-to-mirror axis between the retro-reflecting orthogonal polarization converter 30 and the conventional end mirror 120, the overall configuration of this embodiment operates as an amplified spontaneous emission source. That is, spontaneous emission near the right end of the amplifier is transmitted to the left through the fiber optic amplifier 20 where it is amplified once, strikes the retro-reflecting orthogonal polarization converter 30 and returns through the fiber optic amplifier 20 and is amplified a second time. A portion of the amplified optical signal is in the appropriate polarization state to pass through the direction-selective coupler 10 and out through the input port 10a to strike the end mirror 120.

The amplified optical signal is again reflected back through the direction-selective coupler 10 and fiber optic amplifier 20 to the retro-reflecting orthogonal polarization converter 30 resulting in a third amplification. The retro-reflecting orthogonal polarization converter 30 returns the amplified optical signal with proper polarization rotation to the fiber optic amplifier 20 where it is amplified a fourth time, to be routed through the output port 10b as optical output 10e. Because the spontaneous emission in this embodiment makes a total of four passes through the fiber optic amplifier 20, it is possible to obtain greater energy extraction from the fiber optic amplifier 20 (FIG. 2). The optical output has a single polarization, resulting in an incoherent, amplified spontaneous emission source. This type of amplified spontaneous emission source may be advantageously applied to sensor systems requiring a bright, incoherent light source, such as a fiber optic gyroscope.

Figure 11:
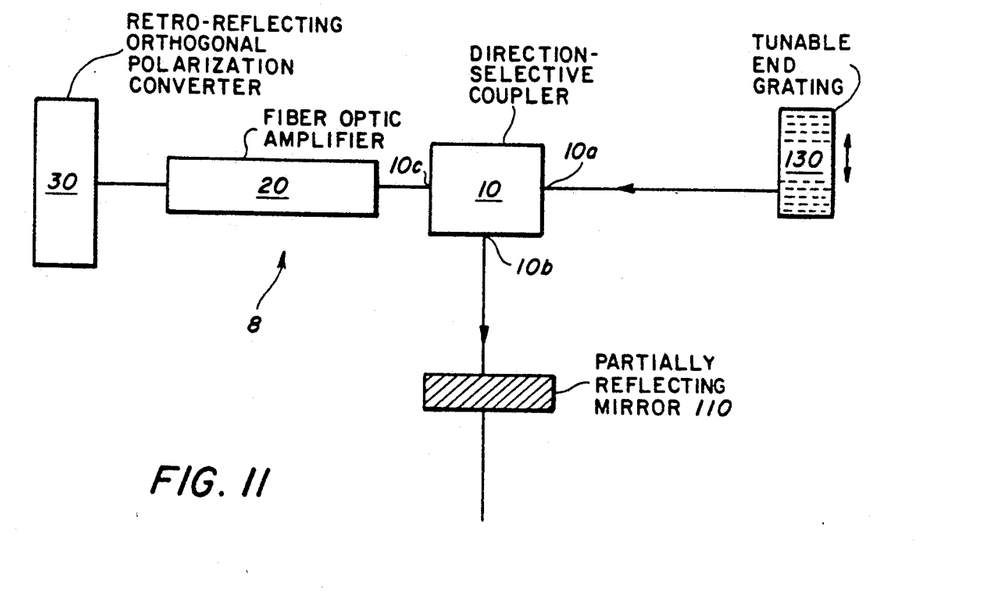
FIG. 11 illustrates a schematic diagram of a seventh embodiment of the single-polarization fiber optical amplifier of the present invention.

FIG. 11 illustrates a schematic diagram of a seventh embodiment of the present invention somewhat similar to that of the fourth embodiment schematically illustrated in FIG. 7, wherein the input port 10a is connected to a conventional tunable end grating 130. The output port 10b of the direction selective coupler 10 is connected to a partially-reflecting output mirror 110. In this embodiment of the present invention, a laser output is provided through the partially-reflecting output mirror 110, the overall configuration resulting in a laser system having a widely tunable optical wavelength. The wavelength of the light returned to the single-polarization fiber optical amplifier 8 (FIG. 2) by the tunable wavelength selective mirror element 130 can be adjusted in a number of ways depending on the type of tunable wavelength selective mirror element used. If a conventional grating is used as the tunable wavelength selective mirror element, the reflected wavelength can be adjusted by changing the incident angle of the light as when a grating is used in the Littrow configuration. If a fiber grating is used as the tunable wavelength selective mirror element the reflected wavelength can be adjusted by stretching the fiber grating or by changing its temperature or by any other means which alters the effective grating period.

Figure 12:
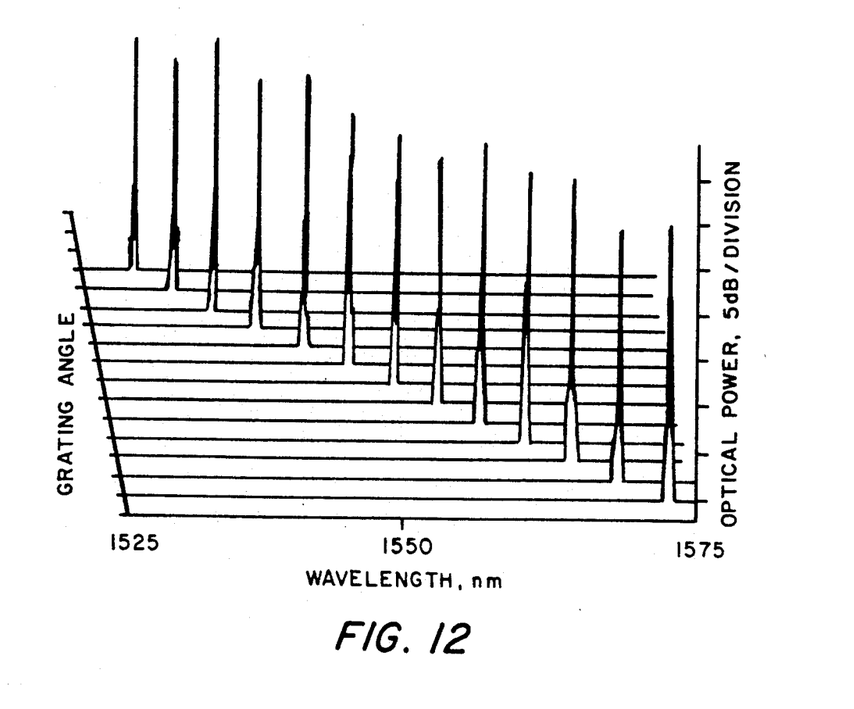
FIG. 12 is a graph demonstrating wavelength tunability of the seventh embodiment of the present invention.

FIG. 12 shows a graph of experimental results demonstrating wavelength tunability of the seventh embodiment of the invention. The graph of FIG. 12 shows output power (dB) of the laser output, indicating a substantially single-wavelength output peak for the embodiment. The output power at various wavelengths is displayed as a function of grating angle, indicating a fairly wide tuning range of at least 1525-1575 nanometers.

While the present invention has been illustrated and described in detail in the drawings and foregoing description, it will be recognized that modifications can occur to persons skilled in the art. It is therefore intended, by the appended claims, to cover any such modifications as within the scope and spirit of the invention.

What is claimed is:

1. A single-polarization fiber optical amplifier comprising:
   direction-selective coupling means for receiving an optical input of a first polarization state in one direction and outputting an optical output of a second polarization state orthogonal to the first polarization state in a second direction;
   fiber optic amplifying means for optically amplifying the optical input in an optical fiber; and
   retro-reflecting orthogonal polarization converting means for reflecting the amplifier optical input from said fiber optic amplifying means in a return direction through said fiber optic amplifying means and in an orthogonal polarization to the amplified optical input.

2. A single-polarization fiber optical amplifier comprising:
   a direction-selective coupler having an input port to receive an optical input of a first polarization state, a bidirectional port and an output port responsive to light input at the bidirectional port for outputting light of a second polarization state orthogonal to the first polarization state;
   a fiber optic amplifier operatively connected at a first end to the bidirectional port of said direction-selective coupler to optically amplify the optical input in an optical fiber; and
   a retro-reflecting orthogonal polarization converter operatively connected to said fiber optic amplifier at a second end of said fiber optic amplifier to receive and reflect the amplified optical input in a return direction with an orthogonal polarization to the amplified optical input.

3. The single-polarization fiber optical amplifier of claim 2 wherein:
   said direction-selective coupler comprises a polarization beam splitter.

4. The single-polarization fiber optical amplifier of claim 2 wherein:
   said direction-selective coupler comprises a polarization-insensitive optical circulator.

5. The single-polarization fiber optical amplifier of claim 2 wherein:
   said optical fiber of said fiber optic amplifier comprises non-polarization-maintaining optical fiber.

6. The single-polarization fiber optical amplifier of claim 5 wherein:
   said non-polarization-maintaining optical fiber comprises optically amplifying fiber.

7. The single-polarization fiber optical amplifier of claim 6 wherein:
   said non-polarization-maintaining optical fiber comprises rare-earth-doped fiber.

8. The single-polarization fiber optical amplifier of claim 7 wherein said optically amplifying fiber comprises:
   erbium-doped fiber.

9. The single-polarization fiber optical amplifier of claim 6 wherein:
   said non-polarization-maintaining optical fiber is operatively coupled in a signal path between said retro-reflecting orthogonal polarization converter and said direction-selective coupler.

10. The single-polarization fiber optical amplifier of claim 2 wherein:
    said retro-reflecting orthogonal polarization converter comprises a lens coupled to a Faraday rotator coupled to an end mirror.

11. The single-polarization fiber optical amplifier of claim 2 further comprising:
    a figure-eight optical laser loop having one end connected to the first port and another end connected to the second port, and forming a lasing cavity; and
    an output coupler coupled to said figure-eight optical laser loop and outputting a laser optical output.

12. The single-polarization fiber optical amplifier of claim 11 wherein:
    said figure-eight optical laser loop comprises a polarization-maintaining optical fiber.

13. The single-polarization fiber optical amplifier of claim 11 wherein:
    said figure-eight optical laser loop comprises a 50% optical fiber coupler operatively connecting opposing sides of said figure-eight optical laser loop at a central point.

14. A single-polarization fiber optical amplifier comprising:
    a direction-selective coupler having an input port to receive an optical input, a bidirectional port and an output port to output light input at the bidirectional port;
    a fiber optic amplifier operatively connected at a first end to the bidirectional port of said direction-selective coupler to optically amplify the optical input in an optical fiber;
    a retro-reflecting orthogonal polarization converter operatively connected to said fiber optic amplifier at a second end of said fiber optic amplifier to receive and reflect the amplified optical input in a return direction with an orthogonal polarization to the amplifier optical input; and
    a polarization-maintaining optical fiber loop operatively connected with a 90° twist between said input port and said output port, said polarization-maintaining fiber loop and said fiber optic amplifier forming a laser cavity.

15. The single-polarization fiber optical amplifier of claim 14 wherein said polarization-maintaining optical fiber loop comprises:
    an optical isolator to cause unidirectional laser oscillation;
    a polarizer to cause single-polarization oscillation; and
    a polarization-maintaining fiber-optic output coupler for outputting the laser light.

16. The single-polarization fiber optical amplifier of claim 15 wherein:
    said fiber optic amplifier comprises a bidirectional optical filter with low back reflection to provide substantially single output wavelength.

17. The single-polarization fiber optical amplifier of claim 16 wherein:
    said bidirectional optical filter is tunable.

18. The single-polarization fiber optical amplifier of claim 15 wherein said retro-reflecting orthogonal polarization converter comprises:

a wavelength selective mirror for providing substantially single output wavelength.

19. The single-polarization fiber optical amplifier of claim 18 wherein:
said wavelength selective mirror is tunable.

20. The single-polarization fiber optical amplifier of claim 15 wherein said polarization-maintaining optical fiber loop comprises:
an optical filter for providing substantially single output wavelength.

21. The single-polarization fiber optical amplifier of claim 20 wherein:
said optical filter is tunable.

22. A single-polarization fiber optical amplifier comprising:
a direction-selective coupler having an input port to receive an optical input, a bidirectional port and an output port to output light input at the bidirectional port;
a fiber optic amplifier operatively connected at a first end to the bidirectional port of said direction-selective coupler to optically amplify the optical input in an optical fiber;
a retro-reflecting orthogonal polarization converter operatively connected to said fiber optic amplifier at a second end of said fiber optic amplifier to receive and reflect the amplified optical input in a return direction with an orthogonal polarization to the amplified optical input; and
a modulator unit initiating an optical pulse, operatively connected to said input port to provide the optical input, said modulator unit and said retro-reflecting orthogonal polarization converter forming opposing ends of a lasing cavity; and
a partially reflecting output mirror operatively connected to said output port and outputting an ultrashort optical pulse as a laser optical output.

23. The single-polarization fiber optical amplifier of claim 22 wherein:
said modulator unit comprises an optical modulator coupled to an end mirror.

24. A single-polarization fiber optical amplifier comprising:
a direction-selective coupler having an input port to receive an optical input, a bidirectional port and an output port to output light input at the bidirectional port;
a fiber optic amplifier operatively connected at a first end to the bidirectional port of said direction-selective coupler to optically amplify the optical input in an optical fiber;
a retro-reflecting orthogonal polarization converter operatively connected to said fiber optic amplifier at a second end of said fiber optic amplifier to receive and reflect the amplified optical input in a return direction with an orthogonal polarization to the amplified optical input; and
a mirror operatively coupled to said input port; and
wherein said direction-selective coupler outputs an amplified spontaneous emission optical output at said output port as the optical output.

25. A single-polarization fiber optical amplifier comprising:
a direction-selective coupler having an input port to receive an optical input, a bidirectional port and an output port to output light input at the bidirectional port;
a fiber optic amplifier operatively connected at a first end to the bidirectional port of said direction-selective coupler to optically amplify the optical input in an optical fiber;
a retro-reflecting orthogonal polarization converter operatively connected to said fiber optic amplifier at a second end of said fiber optic amplifier to receive and reflect the amplified optical input in a return direction with an orthogonal polarization to the amplified optical input; and
a partially-reflecting output mirror operatively coupled to said output port; and
a wavelength selective mirror operatively coupled to said input port, said partially-reflecting output mirror providing a substantially single-wavelength laser output.

26. The single-polarization optical amplifier of claim 25, wherein said wavelength selective mirror comprises:
a tunable end grating.

27. A method for amplifying an optical input, said method comprising the steps of:
(a) receiving an optical input of a first polarization state in one direction;
(b) optically amplifying the optical input in a fiber optic amplifier;
(c) retro-reflecting the fiber optically-amplified optical input from the fiber optic amplifier in a return direction through the fiber optic amplifier with an orthogonal polarization to the amplified optical input; and
(d) outputting the amplified orthogonally-polarized optical input with a second polarization state orthogonal to the first polarization state in a second direction.

* * * * *